United States Patent Office 3,142,663
Patented July 28, 1964

---

3,142,663
POLYMERS WITH CHAINS CONTAINING PHOSPHORUS, CARBON, AND SILICON
Heinz Niebergall, Frankfurt am Main, Germany, assignor to Shell Oil Company, New York, N.Y., a corporation of Delaware
No Drawing. Filed Aug. 15, 1960, Ser. No. 49,439
Claims priority, application Germany May 14, 1957
9 Claims. (Cl. 260—80)

This invention relates to polymers of chains containing phosphorus, carbon and silicon. More particularly, this invention relates to such polymers which are prepared from organo phosphorus and organo silicon compounds.

It is known that compounds containing phosphorus tend to impart flame resistance to resinous materials, and that compounds containing silicon tend to be heat stable. For example, tetraphenyl silane is exceedingly heat stable and usable as a high temperature heat transfer medium. The present invention provides a novel copolymer containing both phosphorus and silicon atoms within the polymer, and these compounds are very stable both thermally and chemically. The copolymers, therefore, are suitable for use by themselves, for example, as heat insulators or they are quite suitable as components which may be grafted onto or interpolymerized with other polymerizable materials such as those containing the —CH=CH$_2$ group in order to provide increased stability and flame resistance.

It has now been found that such copolymers can be prepared by reacting organo silane with organo phosphine oxides, said organo silanes and organo phosphine oxides having olefinic groups in an amount such that the sum of olefinic groups in an organo silane molecule and in an organo phosphine molecule is at least 2. In its preferred form, the organo silane and organo phosphine oxide each contain at least one olefinic group. The reaction is carried out by mixing the reactants together in the presence of a polymerization catalyst suitable for polymerizing olefins. For example, the polymerization catalyst is preferably a peroxide catalyst such as benzoyl peroxide, ditertiarybutyl peroxide, sodium peroxide or hydrogen peroxide. Other classes of catalyst suitable for polymerizing olefins are the acids or acid reacting compounds such as Friedel-Crafts type catalysts. Specific examples of such catalysts are boron trifluoride, aluminum trichloride and ferric chloride. Still another class of polymerization catalyst is ionizing irradiation.

The reaction temperature may vary depending upon the specific monomers and the activity of the catalyst utilized. For example, when the catalysts of the type specifically mentioned above are used, it is preferable to heat the reaction mass in order to achieve the polymerization, and high temperatures tend to speed up the reaction. On the other hand, if ionizing irradiation is used it may be possible to utilize lower temperatures.

If desired, a solvent may be added to assist in temperature control. It is also desirable to utilize a solvent where the phosphine oxide and organo silane are not mutually soluble to provide a mutual solvent. When a solvent is used, it is possible to use any solvent which is inert to the polymerization reaction. For example, paraffin hydrocarbons such as petroleum ether and aromatic solvents such as benzene, toluene, or xylene may be used.

The following reaction schemes illustrate typical modes of reaction which might take place in polymerizing the organo silane and organo phosphine oxide in accordance with this invention:

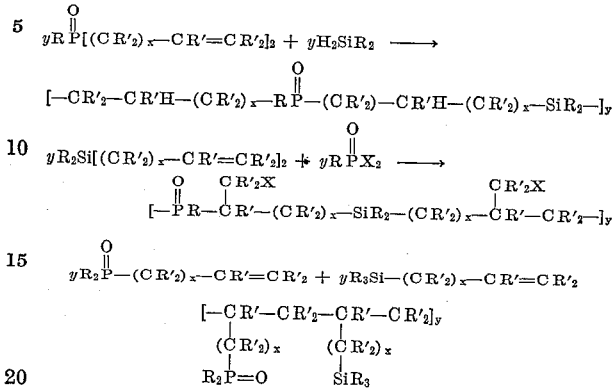

In the above formulae, R is selected from the class consisting of alkyl, aryl, aralkyl, alkaryl and cycloparaffinic radicals, X is fluorine, chlorine, bromine, x is an integer from 0 to 6, and y is any positive integer. Preferably y is greater than 2, R' is H and R.

It is also possible that other reaction combinations may take place and the invention is not intended to be limited by any particular structure. However, a preferred form of the invention is achieved when both the organo phosphine oxide and the organo silane contain an unsaturated group. In such case the reaction scheme might fit the latter one given above, but it is possible that other structures may be present in combination with such structures particularly where a 1:1 ratio is not obtained. As indicated in the examples, it is possible to obtain various ratios depending upon the polymerization conditions as well as the proportions of reactants utilized.

Thus it is seen that by a systematic variation of the substituents or the arrangement of the elements and bonds, a wide range of products can be obtained which are suitable for numerous technical applications. The product obtained can be used as a starting material for other plastics and elastomers or compositions thereof. Special types are also suitable for the manufacture of fibrous materials. In being very resistant against thermal and chemical attack, the products are ideal for applications involving adverse conditions. The solid products can be used for insulation of electrical conductors and other components of electronic equipment and/or protective coatings, foam, structural material and the like of articles of manufacture subjected to high temperatures and corrosive atmospheres. The liquid polymers provide valuable lubricant and heat transfer mediums for scientific and industrial applications.

As indicated above, the organo silane and organo phosphorus compounds may vary widely, and the reaction takes place at the —CH=CH$_2$ group. In its preferred form this group is the —CH=CH$_2$ or terminal vinyl group. It is also preferred to use monomers which are not unduly large, and therefore it might be said that the number of carbon atoms in the silane will generally be less than 30, and the number of carbon atoms in the phosphine oxide will generally be less than, say, 24 carbon atoms.

Examples of preferred organo silanes that might be used are triphenylvinyl silane, triphenylallyl silane, tritolylvinyl silane, tri(phenylethyl)vinyl silane, tricyclohexylvinyl silane, trimethylvinyl silane, triethylvinyl silane, tributylvinyl silane, trioctylvinyl silane, dimethylphenylvinyl silane, methylphenylethylvinyl silane, ethyldiphenylvinyl silane, diphenyldivinyl silane, phenylethyldivinyl silane, phenylmethyldivinyl silane, dimethyldiallyl silane, diethyldiallyl silane, dicyclohexyldivinyl silane, and dipropyldiallyl silane. The R group attached to the silicon will preferably be from 1 to 8 carbon atoms, although larger groups are operative.

In general, any olefinic tertiary phosphine oxide may be used. Examples of organo phosphine oxides that may be used include diphenylvinylphosphine oxide, diphenylallylphosphine oxide, ditolyvinylphosphine oxide, di(phenylethyl-)vinylphosphine oxide, dicyclohexylvinylphosphine oxide, dimethylvinylphosphine oxide, diethylvinylphosphine oxide, dibutylvinylphosphine oxide, dioctylvinylphosphine oxide, dimethylallylphosphine oxide, diethylallylphosphine oxide, dimethylphenylphosphine oxide, ethylphenylallylphosphine oxide, ethyldivinylphosphine oxide, phenyldivinylphosphine oxide and propyldiallylphosphine oxide.

The products obtained are viscous liquids, elastic materials or resins, are thermally and chemically very stable, and are not hydrolyzed under the influence of alkali and acids. They are resistant to oxygen. They may also be halogenated, and the halogen containing materials have an increased flame-resistance.

The present invention and typical polymerization reactions are further illustrated by the following examples.

In these examples, the copolymerizations were carried out in a conventional manner. The monomers, with or without a solvent (depending on the solubility of the two components in one another), were brought to polymerization, after addition of the initiator, in a small four-necked flask fitted with a stirrer, reflux condenser, and an inlet for introducing nitrogen. The reaction temperature was kept constant during the reaction by means of an oil bath.

*Example I*

(a) 2.28 grams (0.01 mol) of diphenylvinylphosphine oxide and 2.86 grams (0.01 mol) triphenylvinylsilane were mixed with 1% by weight of ditertiarybutyl peroxide and heated for two hours at 150–155° C. Upon cooling to room temperature, the viscous reaction product solidifies to a clear, transparent mass. To purify and isolate the polymerization product, the solid reaction product was dissolved in benzene and precipitated by stirring into petroleum naphtha. The precipitation is repeated twice. Yield of solid substance: 40% based on the quantity of monomer charged.

*Analysis.*—Found: P, 9.8%; Si, 3.6%. Calc. for 1:1 copolymerization: P, 6.0%; Si, 5.5%. Mean molecular weight, 3200.

(b) The same mixture as described under (a) was held 19 hours at 145° C. The reaction product, which forms a transparent mass on chilling, was dissolved in benzene and the benzene solution dialyzed with methanol for 72 hours using a "Cellophane" membrane as the dialysis membrane. To isolate the polymerizate after the dialysis, the solvent was distilled off from the dialysis membrane contents in a vacuum. The product obtained was twice dissolved in benzene and precipitated with petroleum naphtha. The quantity of substance isolated amounted to about 14% of the charged monomers.

*Analysis.*—P, 8.9%; Si, 2.9%. Softening interval, 103–120° C.

(c) The same mixture as described under (a) was held at 155° C. for 2 hours. The polymerization product which is a strongly viscous solution was isolated from the reaction product by diluting benzene and precipitated with petroleum naphtha, then the benzene solution, as in Example (b), was dialyzed for 41 hours with ethanol. By distilling off the solvent, a white solid product was isolated from the solution in the dialysis membrane, which on analysis gave the following value: P, 9.8%; Si, 2.8%. The yield amounted to 25% of the amount of charged monomers.

*Example II*

2.28 grams (0.01 mol) of diphenylvinylphosphine oxide and 1.42 grams (0.01 mol) of triethylvinylsilane held for 20 hours at 150–155° C. with 1% by weight of ditertiarybutyl peroxide and 2 ml. of xylene (xylene is added in order to obtain a homogeneous mixture of both components). Upon cooling the reaction mixture, two layers are formed, an upper soft mobile layer and a lower tough, almost solid layer. This lower solid layer was dissolved in benzene and the benzene solution was dialyzed first with petroleum ether for 24 hours. After the dialysis, the polymerization product was isolated by distilling off the solution in the dialysis membrane.

Yield: 53% of the amount of monomer charged.

*Analysis.*—P, 9.8%; Si, 3.5%. Mean molecular weight, 1400.

*Example III*

2.56 grams (0.01 mol) of diphenylmethallylphosphine oxide and 2.86 grams (0.01 mol) of triphenylvinylsilane were copolymerized with 1% by weight of ditertiarybutyl peroxide for 20 hours at 150° C. The reaction product, which is viscous at 150° C. and is a clear, solid product at room temperature, was dissolved in benzene and the benzene solution was dialyzed, first with ethanol for 48 hours, then with petroleum ether for 24 hours. After isolation of the product in the dialysis membrane by distilling off the solvent, the solid product was dissolved and precipitated with petroleum ether.

Yield: 52% of the amount of charged monomers.

*Analysis.*—P, 7.9%; Si, 4.6%.

*Example IV*

11.2 grams (0.1 mol) triethylvinylsilane are heated during 6 hours with 13.2 grams (0.1 mol) diethylvinylphosphine oxide and 0.1 gram benzoyl peroxide at a temperature of 85° C. A colorless elastic material is formed which does not deteriorate at 300° C. and which is stable in water, alkaline materials and acids.

*Example V*

11.2 grams (0.1 mol) diethyldivinylsilane are heated during 6 hours with 13.3 grams (0.1 mol) methylphosphonyl chloride and 0.1 gram AlCl₃ at a temperature of 85° C. A colorless elastic material is formed, which does not change its properties at a temperature of 350° C.

I claim as my invention:

1. A copolymerization process which comprises heating about equimolar proportions of a trihydrocarbyl vinyl silane and a dihydrocarbyl vinyl phosphine oxide, wherein each hydrocarbyl radical is selected from the group consisting of alkyl and aryl radicals for 2–20 hours at 85–155° C. in the presence of an olefin polymerization catalyst.

2. Novel copolymers with chains containing phosphorus, carbon and silicon, which are the reaction products of about equimolar proportions of organo silanes having the formula

where R represents a member of the class consisting of alkyl and aryl radicals, and organo phosphine oxides having the formula

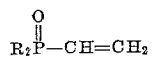

where R is as defined above, said copolymers having been made by the process according to claim 1.

3. Novel copolymers as defined in claim 2, in which R is phenyl.

4. Novel copolymers as defined in claim 2, in which R is ethyl.

5. Novel copolymers with chains containing phosphorus, carbon and silicon, which are the reaction products of about equimolar proportions of triethylvinylsilane and diphenylvinylphosphine oxide, said copolymers having been made by the process according to claim 1.

6. The process defined in claim 1, in which the catalyst is selected from the group consisting of peroxide catalysts, and Friedel-Crafts catalysts.

7. A process for the preparation of copolymers having chains containing phosphorus, carbon and silicon, which comprises reacting about equimolar proportions of triethylvinylsilane with diethylvinylphosphine oxide in the presence of a peroxide catalyst for 2–20 hours at 85–155° C.

8. A process for the preparation of copolymers having chains containing phosphorus, carbon and silicon, which comprises reacting about equimolar proportions of diphenylvinylphosphine oxide with triphenylvinylsilane in the presence of a peroxide catalyst for 2–20 hours at 85–155° C.

9. A process for the preparation of copolymers having chains containing phosphorus, carbon and silicon, which comprises reacting about equimolar proportions of diphenylvinylphosphine oxide with triethylvinylsilane in the presence of a peroxide catalyst for 2–20 hours at 85–155° C.

References Cited in the file of this patent

UNITED STATES PATENTS

| | | |
|---|---|---|
| 2,532,583 | Tyran | Dec. 5, 1950 |
| 2,835,690 | Prober | May 20, 1958 |
| 2,843,615 | Linville | July 15, 1958 |
| 2,920,094 | Fekete | Jan. 5, 1960 |
| 2,957,931 | Hamilton et al. | Oct. 25, 1960 |
| 2,963,503 | Marsden | Dec. 6, 1960 |